United States Patent
Ukil et al.

(10) Patent No.: US 9,355,258 B2
(45) Date of Patent: May 31, 2016

(54) SYSTEM AND METHOD FOR DATABASE PRIVACY PROTECTION

(71) Applicants: Arijit Ukil, Kolkata (IN); Jaydip Sen, Kolkata (IN)

(72) Inventors: Arijit Ukil, Kolkata (IN); Jaydip Sen, Kolkata (IN)

(73) Assignee: Tata Consultancy Services Limited (IN)

( * ) Notice: Subject to any disclaimer, the term of this patent is extended or adjusted under 35 U.S.C. 154(b) by 25 days.

(21) Appl. No.: 14/345,818

(22) PCT Filed: Sep. 25, 2012

(86) PCT No.: PCT/IN2012/000638
§ 371 (c)(1),
(2) Date: Mar. 19, 2014

(87) PCT Pub. No.: WO2013/072930
PCT Pub. Date: May 23, 2013

(65) Prior Publication Data
US 2014/0237620 A1    Aug. 21, 2014

(30) Foreign Application Priority Data
Sep. 28, 2011  (IN) ......................... 2733/MUM/2011

(51) Int. Cl.
*H04L 29/06* (2006.01)
*G06F 21/60* (2013.01)
*G06F 21/62* (2013.01)

(52) U.S. Cl.
CPC ............ *G06F 21/60* (2013.01); *G06F 21/6227* (2013.01); *G06F 21/6254* (2013.01)

(58) Field of Classification Search
CPC ............ G06F 17/00; G06F 21/00; H04L 9/00
See application file for complete search history.

(56) References Cited

U.S. PATENT DOCUMENTS

2004/0101136 A1*  5/2004  Hershey et al. ................. 380/42
2010/0223276 A1*  9/2010  Al-Shameri et al. .......... 707/769

* cited by examiner

*Primary Examiner* — Joseph P Hirl
*Assistant Examiner* — Leynna Truvan
(74) *Attorney, Agent, or Firm* — Finnegan, Henderson, Farabow, Garrett & Dunner, LLP

(57) ABSTRACT

The invention relates to a system and a method for privacy preservation of sensitive attributes stored in a database. The invention reduces the complexity and enhances privacy preservation of the database by determining the distribution of sensitive data based on Kurtosis measurement. The invention further determines and compares the optimal value of k-sensitive attributes in k-anonymity data sanitization model with the optimal value of l sensitive attributes in l diversity data sanitization model using adversary information gain. The invention reduces the complexity of the method for preserving privacy by applying k anonymity only, when the distribution of the sensitive data is leptokurtic and optimal value of k is greater than the optimal value of l.

12 Claims, 6 Drawing Sheets

US 9,355,258 B2

SYSTEM AND METHOD FOR DATABASE PRIVACY PROTECTION

CROSS-REFERENCE TO RELATED PATENT APPLICATIONS

This application is a National Stage Entry under 35 U.S.C. §371 of International Application No. PCT/IN2012/000638, filed Sep. 25, 2012, which claims priority from Indian Patent Application No. 2733/MUM/2011, filed Sep. 28, 2011. The entire contents of the above-referenced applications are expressly incorporated herein by reference for all purposes.

FIELD OF THE INVENTION

The present invention relates to a method and a system for privacy preservation of a sensitive data. More particularly, the invention relates to the method and the system for reducing complexity and enhancing privacy preservation of the sensitive data in one or more database.

BACKGROUND OF THE INVENTION

Storing data for the use in future for various purposes is a well known and frequently followed technique now days. Privacy preserving data mining is a research area concerned with protecting privacy derived from personally identifiable information in the process of data mining. Today privacy is an essential feature for both a user as well as an enterprise. Many organizations collect data for scientific research as well as for market analysis. Access to this data is also given to third parties for further productive analysis. The available datasets pose serious threats against the privacy of individuals and organizations. In view of this concern to address privacy of sensitive data, lot of research techniques have been proposed, laws are formed and management techniques are in developed.

The most popular techniques followed for preserving privacy are data perturbation, cryptographic methods and protocols for data sharing, statistical techniques for disclosure and interference etc. All these methods are frequently used but they involve utility loss. More ideal the privacy preservation model is, more is the utility loss, i.e. the information derived from the database becomes less. An absolute privacy protected database has zero utility. Another primary technique used to control the flow of sensitive information is suppression where sensitive information and all information that allows the inference of sensitive information are simply not released. However, suppression can drastically reduce the quality of the data and in the case of statistical use; overall statistics can be altered, rendering the data practically useless.

Nowadays, k-anonymity and l-diversity are also available methods for privacy preservation. In a k-anonymized dataset, each record is indistinguishable from at least k−1 other records with respect to certain "identifying" attributes. On the other hand l-diversity provides privacy even when the data publisher does not know what kind of knowledge is possessed by the adversary. The associated problem with these solutions is that they are NP-hard in nature as they are basically search over space of possible multi-dimensional solutions. Also the high dimensionality of these techniques adds computational overhead.

Therefore, there is a need of a method and a system for preserving privacy of the data which reduces the computational complexity. Also, a system and method is needed that increases the degree of utility of data along with the reduction in information loss.

OBJECTS OF THE INVENTION

It is the primary object of the invention to reduce the complexity of the data sanitization model while preserving the same amount of privacy.

It is yet another object of the invention to provide privacy of the sensitive data bases on its distribution pattern.

It is yet another object of the invention to reduce the utility loss while preserving the required privacy.

SUMMARY OF THE INVENTION

The present invention discloses a method for reducing complexity and enhancing privacy preservation of a database with a plurality of sensitive attributes. The method comprises of processor implemented steps of determining a distribution pattern of the sensitive attributes by applying Kurtosis measurement of the corresponding data of the database to ascertain whether the distribution pattern of the sensitive data is leptokurtic, determining an adversary information gain for the k-anonymity data sanitization model and the adversary information gain for a k-anonymity l-diversity data sanitization model and comparing the adversary gain of the k-anonymity data sanitization model with the adversary information gain of the k-anonymity l-diversity data sanitization model till the adversary information gain of the k-anonymity data sanitization model becomes equal to the adversary information gain of the k-anonymity l-diversity data sanitization model. The method further comprises of determining an optimal value of l for performing l-diversity based data sanitization on the sensitive records and computing an optimal value of k for performing k-anonymity based data sanitization on the sensitive attributes and performing privacy preservation of the sensitive attributes by only k-anonymity data sanitization model when k is greater than l and the distribution pattern is leptokurtic such that the k-anonymity provides the same amount of privacy protection as provided by k-anonymity l-diversity data sanitization model.

A system for reducing complexity and enhancing privacy preservation of a database with a plurality of sensitive attributes is disclosed. The system comprises of a computer readable medium for storing a sanitized database to store k sensitive attributes of a k-anonymity data sanitization model and l sensitive attributes of an l-diversity data sanitization model, a control device configured for operating a calculating module for determining a distribution pattern of the sensitive attributes through Kurtosis measurement of the corresponding data of the database, for determining an optimal value of a k sensitive attributes in a k-anonymity data sanitization model and an optimal value of l sensitive attributes in an l-diversity data sanitization model and for determining an adversary information gain of k-anonymity data sanitization model and an adversary information gain of k-anonymity l-diversity data sanitization model. The system further comprises of a comparator for comparing the adversary information gain of k-anonymity data sanitization model with the adversary information gain of k-anonymity l-diversity data sanitization model and for comparing the optimal value of the l sensitive attributes in the l-diversity data sanitization model with the optimal value of the k sensitive attributes in the k-anonymity data sanitization model and storing the same in a computer readable medium. The system further comprises of a processor communicatively coupled with the comparator for performing privacy preservation of the sensitive data with leptokurtic distribution by applying the k-anonymity data sanitization model, if the optimal value of k sensitive records in the k-anonymity sanitization method is greater than the optimal value of l sensitive records in the l-diversity sanitization method and an evaluation module for evaluating the reduction in complexity of k-anonymity data sanitization model for performing the privacy preservation of the sensitive data.

The present invention also discloses a system for reducing complexity and enhancing privacy preservation of a database with a plurality of sensitive attributes. The system comprises of a computer readable medium for storing the corresponding data of the database storing k sensitive attributes of a k-anonymity data sanitization model and l sensitive attributes of an l-diversity data sanitization model and a control device configured for operating a calculating module for determining a distribution pattern of the sensitive attributes through Kurtosis measurement of the corresponding data of the database, for determining an optimal value of a k sensitive attributes in a k-anonymity data sanitization model an optimal value of l sensitive attributes in an l-diversity data sanitization model and for determining an adversary information gain of k-anonymity data sanitization model and an adversary information gain of k-anonymity l-diversity data sanitization model. The system further comprises of a comparator for comparing the adversary information gain of k-anonymity data sanitization model with the adversary information gain of k-anonymity l-diversity data sanitization model and for comparing the optimal value of the l sensitive attributes in the l-diversity data sanitization model with the optimal value of the k sensitive attributes in the k-anonymity data sanitization model and storing the same in the computer readable medium, a processor communicatively coupled with the comparator for performing privacy preservation of the sensitive attributes with leptokurtic distribution by applying the k-anonymity data sanitization model, if the optimal value of k sensitive attributes in the k-anonymity sanitization method is greater than the optimal value of l sensitive attributes in the l-diversity sanitization method and an evaluation module for evaluating the reduction in complexity of k-anonymity data sanitization model for performing the privacy preservation of the sensitive data.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention discloses a method and a system for privacy preservation of a database storing a plurality of sensitive attributes. The sensitive attributes store sensitive data. The present invention provides protection to the sensitive attributes by enhancing privacy and reducing complexity of the overall system.

Figure 1:
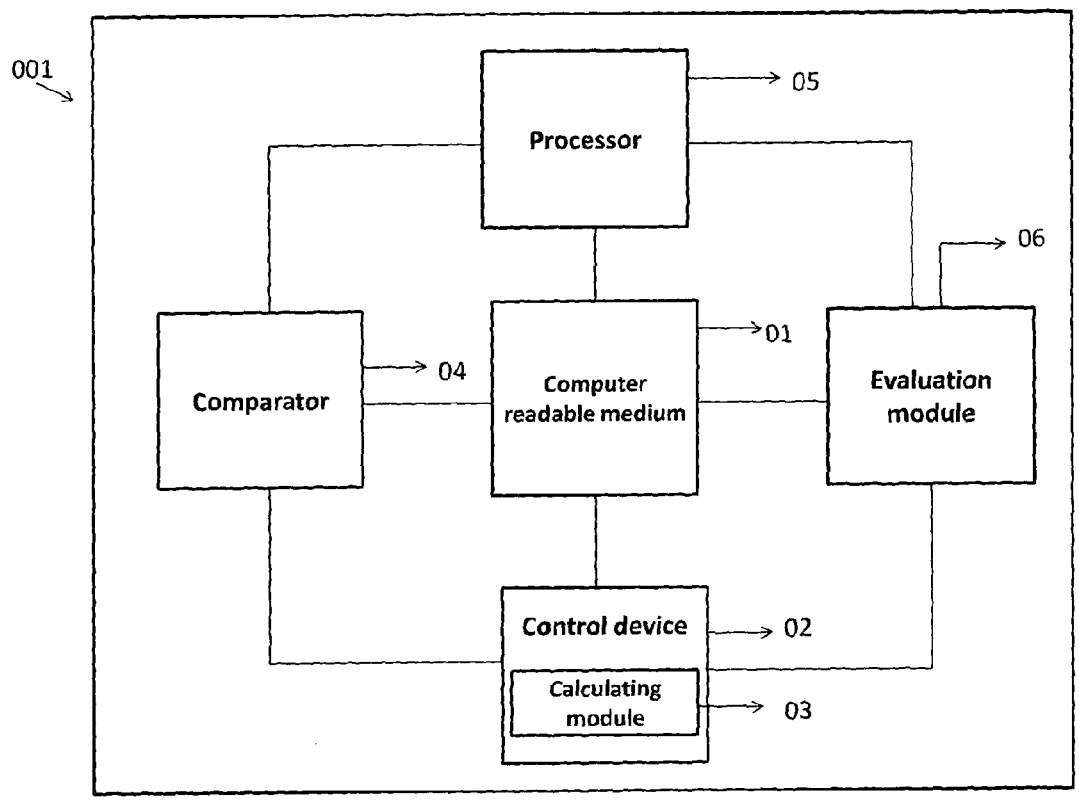
FIG. 1 illustrates the architecture of the system in accordance with the primary embodiment of the invention.

In accordance with an embodiment, referring to FIG. 1, the system (001) comprises of a computer readable medium (01) for storing the data to be protected. The data includes a plurality of sensitive attributes which is further divided into the sensitive attributes of a k-anonymity data sanitization model and l sensitive attributes of l-diversity data sanitization model.

The system (001) may include a plurality of the computer readable medium (01) for storing the data to be protected.

Figure 2:
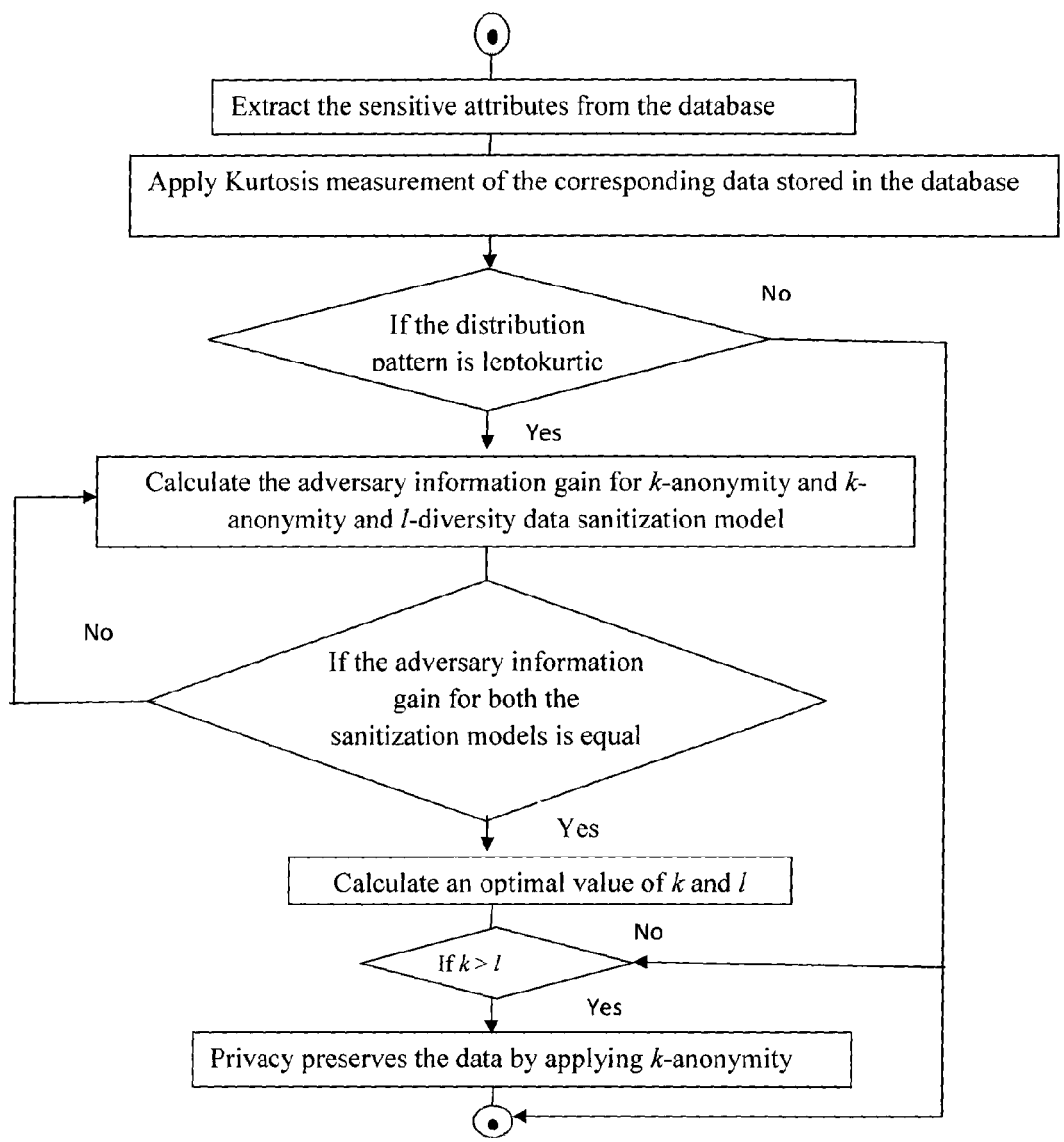
FIG. 2 illustrates the process flow chart in accordance with an embodiment of the invention.

Still referring to FIG. 1, the system (001) further comprises of a control device (02) for controlling the calculative steps performed by its calculating module (03). Referring to FIG. 2, step 201 extracts the sensitive attributes from the computer readable medium (01) of the system (001). Step 202 applies the Kurtosis measurement of the corresponding data of the database. Kurtosis is a good indicator of diversity spread. Kurtosis a measure of the peakedness of distribution of the data stored in the database. Distributions that are more peaked than the normal distribution have a Kurtosis greater than 3, whereas the distributions that are flattened have a Kurtosis less than 3. Step 203 further checks if the distribution pattern of the data stored in the database in the form of the sensitive attributes is leptokurtic in nature. If the distribution pattern is not leptokurtic, the system (001) will not privacy preserve the sensitive attributes. Further, Kurtosis of the data is defined as, $$\kappa = \frac{E(s-\mu)^4}{\sigma^4} - 3$$

For the leptokurtic distribution, value of $\kappa$ is greater than 3.

Still referring to FIGS. 1 and 2, the step 204 determines an adversary information gain for the k sensitive attributes of the k-anonymity data sanitization model and the adversary information gain for the k-anonymity l-diversity data sanitization model. The calculating module (03) of the control device (02) calculates the adversary information gain for the k-anonymity data sanitization model and the k-anonymity l-diversity data sanitization model.

The system (001) further comprises of a comparator (04) for comparing the adversary information gain for the k-anonymity and k-anonymity l-diversity data sanitization model. Step 205 compares whether the adversary information gain for k-anonymity and k-anonymity l-diversity data sanitization model are equal. The comparator (04) keeps on comparing the adversary information for both the data sanitization models till both the values of the adversary information gain become equal.

The calculating module (03) further calculates an optimal value of k sensitive attributes in k-anonymity data sanitization model and the optimal value of l sensitive attributes in l-diversity data sanitization model. The optimal value of k and the optimal value of l are calculated by using a Normalized Certainty Penalty (NCP) which measures the generalization of the sensitive attributes in terms of internal size. The NCP further transforms a table of sensitive attributes T to the table of sensitive attributes T*. Consider a table T with the set of quasi-identifying attributes $(A_1, \ldots, A_n)$. Let a tuple $t=(x_1, \ldots, x_n)$ is generalized to tuple $t=([y_1,z_1], \ldots, [y_n,z_n])$, such that $y_i \le x_i \le z_i$. Then, we define NCP of tuple t on attribute $A_i$ as:

$$NCP_{A_i}(t) = \frac{z_i - y_i}{|A_i|}$$

$$|A_i| = \max_{t \in T} t \cdot A_i - \min_{t \in T} t \cdot A_i$$

An Adversary's baseline knowledge $(A_{base})$ $A_{base}$ is defined as the vector of probabilities representing the distribution of the sensitive attribute values in the entire table T.

$$A_{base} = \langle p(T,s_1), \ldots, p(T,s_n) \rangle$$

p(U,s) is the probability that a randomly chosen member of U has the sensitive attribute value S.

An Adversary's posteriori knowledge $(A_{san})$ can uniquely identify the quasi-identifier equivalence class <t> containing the sanitized record of t in T'. $A_{san}$ is the distribution of sensitive attribute values within this class <t>.

$$A_{san}(\langle t \rangle) = \langle p(\langle t \rangle, s_1), \ldots, p(\langle t \rangle, s_n) \rangle$$

Step 207 compares the optimal value of k sensitive attributes and the optimal value of l sensitive attributes through the comparator (04). The comparator (04) checks whether the optimal value of k is greater than the optimal value of l. If the optimal value of k is not greater than l, the system does not privacy preserve the sensitive attributes.

The system (001) further comprises of a processor (05) communicatively coupled with the comparator (04) configured for privacy preserving the sensitive attributes. k-anonymized l-diversity data sanitization model is used to privacy preserve the database to maximize utility score (information gain) while $\delta < \delta_{Threshold}$. As the value of k in k-anonymity data sanitization model increases, the lesser will be the knowledge gained by the adversary $A_{know}$ $(=A_{san}$, when $A_{base} < A_{Thrshold\_base})$ looking at the sanitized database. When $k > K_{th}$ where $K_{th}$ is a threshold, the adversarial knowledge gain $A_{know}$ becomes zero. Also, when the l-diversity is included along with k-anonymity in the sanitization method, there is a substantial reduction of the adversarial knowledge gain, that is, $A_{know}^l \le A_{know}$, where $A_{know}^l$ is the adversarial knowledge gain when the sanitization method includes k-anonymity and l-diversity. As, $A_{know} = f(k)$ and $A_{know} = f(k,l)$, when $k \gg l$, $A_{know} \rightarrow A_{know}^l$, provided that the threshold value when l-diversity is included in the sanitization method, $K_{Th}^l$, remains same, i.e., $K_{Th}^l \equiv K_{Th}$. This happens due to the fact that for l-diversity, adversary's accuracy gain decreases with increasing l and for k-anonymity, adversary's knowledge gain decreases with increasing k. Increasing k value much larger than l of k-anonymized l-diverse sanitization, decreases the privacy disclosure probability ($\delta$) which reduces adversary's information gain (related to l-diversity).

Still referring to FIGS. 1 and 2, Step 208 performs the privacy preservation of the sensitive attributes stored in the database, when the distribution pattern of the data is leptokurtic (value of Kurtosis is greater than 3) and when the optimal value of k is greater than the optimal value of l. The processor performs the privacy preservation by applying the k-anonymity data sanitization model as this privacy preservation is of the same amount as provided by k-anonymity l-diversity data sanitization model. Also, there is a reduction in the complexity while protecting the data by applying k-anonymity data sanitization model.

The system (001) further comprises of an evaluation module (06) configured for evaluating the reduction in complexity of k-anonymity data sanitization model for performing the privacy preservation of the data. The evaluation module evaluates the reduction in complexity from $O(k*l^2)$ to $O(k)$ when the privacy preservation is performed by applying k-anonymity data sanitization model when the distribution pattern of the data is leptokurtic and when the optimal value of k is greater than the optimal value of l.

Figure 3:
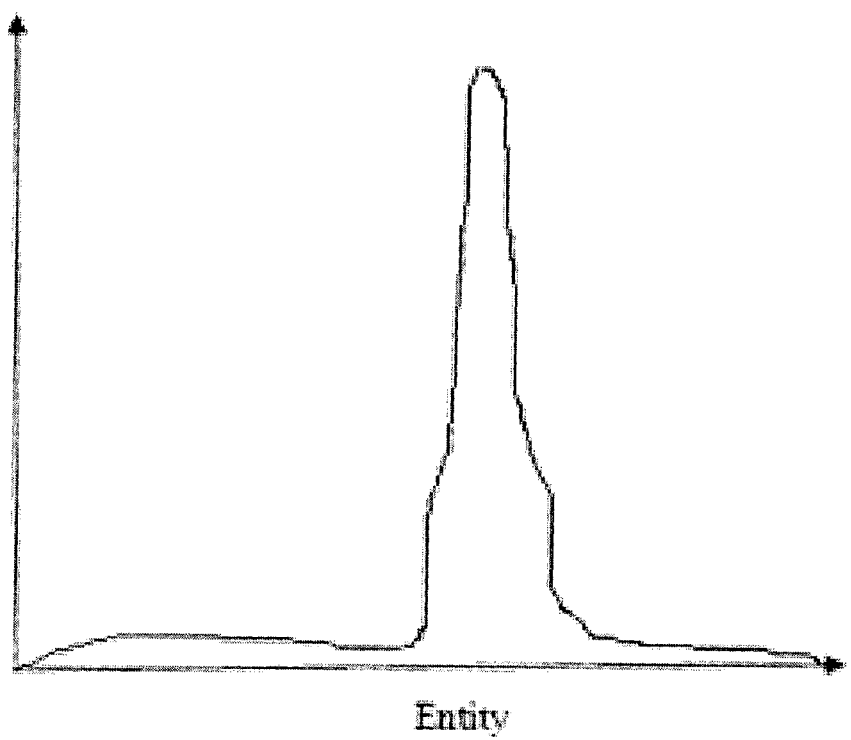
FIG. 3 illustrates the distribution pattern in accordance with an alternate embodiment of the invention.

By way of a specific example, referring to FIG. 3, Let $T = \{t_1, t_2, \ldots, t_n\}$ be a table with sensitive attributes $\{A_1, A_2, \ldots, A_m\}$. Let us assume that T is a subset of some larger population $\Omega$ where each tuple represents an individual from the population. Let $\Lambda$ denote the set of all attributes $\{A_1, A_2, \ldots, A_m\}$ and $t[A_i]$ denote the value of attribute $A_i$ for tuple t. Now, if $C = \{C_1, C_2, \ldots, C_p\} \subseteq \Lambda$, the notation t[C] denotes the tuple $(t[C_1], \ldots, t[C_p])$, which is the projection of t onto the attributes in C.

Let S denote the set of all sensitive attributes. All attributes that are not sensitive are called nonsensitive attributes. Let N denote the set of nonsensitive attributes.

The k-anonymity is a property that captures the protection of released data against possible re-identification of the respondents to whom the released data refer. The k-anonymity demands that every tuple in the private table being released be indistinguishably related to no fewer than k respondents. In k-anonymity, in the released table itself, the respondents be indistinguishable (within a given set of individuals) with respect to the set of attributes, called quasi-identifier, that can be exploited for linking. A table T satisfies k-anonymity if for every tuple $t \in T$, there exist k-1 other tuples $t_{i_1}, t_{i_2}, t_{i_{k-1}} \in T$ such that $t[C] = t_{i_1}[C] = t_{i_2}[C] = \ldots = t_{i_{k-1}}[C]$ for all $C \in QI$. The k-anonymity is effective in preventing identification of a record, but it may not always be effective in preventing inference of the sensitive values of the attributes of that record. k-anonymity suffers from homogeneity and background knowledge attack. Let a q*-block be a set of tuples such that its non-sensitive values generalize to q*. A q*-block is l-diverse if it contains l "well represented" values for the sensitive attribute S. A table is l-diverse, if every q*-block in it is l-diverse.

In order to preserve privacy of a database from attacker, it is absolute necessary that both k-anonymity and l-diversity is to be incorporated. The next step to transform the table T to T*, such that O (T→T*)≤φ where φ stands for publishing time of the sensitive attributes.

$\delta(T \rightarrow T^*) < \delta_{Threshold}$

Distribution pattern of sensitive attributes: By using the kurtosis measure to find the pattern of the sensitive distribution. Kurtosis ($\kappa$), $\kappa$ is defined:

$$\kappa = \frac{E(s-\mu)^4}{\sigma^4} - 3$$

| Name | Age | Sex | HIV | Salary |
| --- | --- | --- | --- | --- |
| John | 56 | M | HIV Negative | 250K |
| Rita | 45 | F | HIV Negative | 9425K |
| Doug | 19 | M | HIV Negative | 21K |
| Eva | 71 | F | HIV Negative | 291K |

-continued

| Name | Age | Sex | HIV | Salary |
|---|---|---|---|---|
| Martin | 22 | M | HIV Positive | 163K |
| Alice | 43 | F | HIV Negative | 151K |
| Tim | 31 | M | HIV Negative | 208K |

The unimodal kurtosis κ of FIG. 3 is +7.8.

Distribution Aware Variable Privacy Method:

By using Normalized Certainty Penalty (NCP) the generalization of attribute A, in terms of interval size is measured. Consider a table T with the set of quasi-identifying attributes $(A_1, \ldots, A_n)$. Suppose a tuple $t=(x_1, \ldots, x_n)$ is generalized to tuple $t=([y_1,z_1], \ldots, [y_n,z_n])$, such that $y_i \leq x_i \leq z_i$. Then, the NCP of tuple t on attribute $A_i$ is:

$$NCP_{A_i}(t) = \frac{z_i - y_i}{|A_i|}$$

$$|A_i| = \max_{t \in T} t \cdot A_i - \min_{t \in T} t \cdot A_i$$

Adversary's baseline knowledge ($A_{base}$) is the vector of probabilities representing the distribution of sensitive attribute values in the entire table T.

$$A_{base} = \langle p(T,s_1), \ldots, p(T,s_n) \rangle$$

p(U,s) is the probability that a randomly chosen member of U has the sensitive attribute value S.

Adversary's posteriori knowledge ($A_{san}$) identifies the quasi-identifier equivalence class <t> containing the sanitized record of t in T'. $A_{san}$ is the distribution of sensitive attribute values within this class <t>.

$$A_{san}(\langle t \rangle) = \langle p(\langle t \rangle, s_1), \ldots, p(\langle t \rangle, s_n) \rangle$$

By using k-anonymized l-diverse data sanitization model, the privacy preservation of the database is performed to maximize the utility score (information gain) while $\delta < \delta_{Threshold}$. As the value of k in k-anonymity increases, the lesser will be the knowledge gained by the adversary $A_{know}$ ($=A_{san}$, when $A_{base} < A_{Thrshold\_base}$) looking at the sanitized database. When $k > K_{th}$ where $K_{th}$ is a threshold, the adversarial knowledge gain $A_{know}$ becomes zero. Also, when l-diversity is included along with k-anonymity in the sanitization method, there is a substantial reduction of the adversarial knowledge gain, that is, $A_{know}^l \leq A_{know}$, where $A_{know}^l$ is the adversarial knowledge gain when the sanitization method includes k-anonymity and l-diversity, as we know $A_{know}=f(k)$ and $A_{know}^l=f(k,l)$. But, when $k >> 1$, $A_{know} \to A_{know}^l$, provided that the threshold value when l-diversity is included in the sanitization method, $K_{Th}^l$, remains same, i.e., $K_{Th}^l = K_{Th}$. This happens due to the fact that for l-diversity, adversary's accuracy gain decreases with increasing l and for k-anonymity, adversary's knowledge gain decreases with increasing k. Increasing k value much larger than l of k-anonymized l-diverse sanitization, decreases the privacy disclosure probability (δ) which reduces adversary's information gain (related to l-diversity). We prove that adversary's information gain is bounded by δ. So, providing S is sufficient when k>>l.

Adversary's information gain (I. Gain) is the amount of information the adversary gains about the original database analyzing the published database. I. Gain (S, Q) is defined as the difference between the entropy of S and the conditional entropy H(S|Q): I. Gain (S, Q)=H(S)−H(S|Q).

Lemma.

If T satisfies δ-disclosure privacy, then I. Gain (S, Q)<δ.

We say that an equivalence class ⟨ t ⟩ is δ-disclosure private with regard to the sensitive attribute S, if for all s∈S, $$\left| \log \frac{p(\langle t \rangle, s)}{p(T, s)} \right| < \delta$$

A table T is δ-disclosure private if for every $t \in E_Q$, ⟨ t ⟩ is δ-disclosure private [10].

BEST MODE/EXAMPLE FOR WORKING OF THE INVENTION

There are two test cases, with sensitive attributes in medical domain (patient's disease/treatment information) and portfolio management in finance (customer's salary information). Following are the outcomes of the parameters based on which is the effectiveness of the data sanitization model. This is shown in Table I.

TABLE I

PARAMETER VALUES OF THE EXPERIMENT DATA BASES

| No. | Test Case | Evaluated Parameters | | |
|---|---|---|---|---|
| 1. | User requests for medical database publication | | Required privacy provided k = 5. | |
| | | Measures | k only | k with l |
| | | NCP | 27.52 | 32.57 |
| | | $A_{know}$ | 0.238 | 0.202 |
| | | $A_{acc}$ | 0.14 | 0.11 |
| | | ∂ | 0.52 | 0.43 |
| 2. | User requests for salary database publication | | Required privacy provided k = 10. | |
| | | Measures | k only | k with l |
| | | NCP | 32.76 | 34.55 |
| | | $A_{know}$ | 0.152 | 0.149 |
| | | $A_{acc}$ | 0.09 | 0.09 |
| | | ∂ | 0.436 | 0.436 |

The results are obtained from experiments on medical database publication. It is assumed that an outsider researcher intends to survey a medical database of a hospital consisting of patients' overall information including the diseases, tests and drugs administered. Individual record of patients is not important to the researcher, his/her main intention is to observe the trend of the treatment and success rate.

Figure 4:
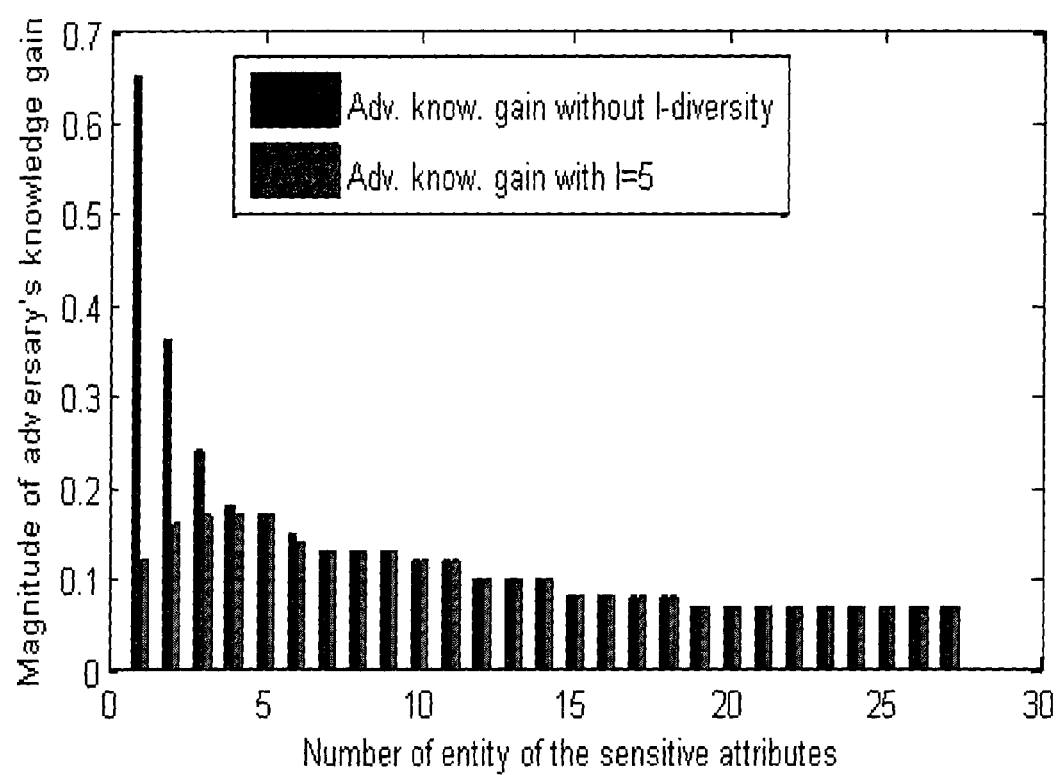
FIG. 4 illustrate exemplary embodiments of the invention.
Figure 5:
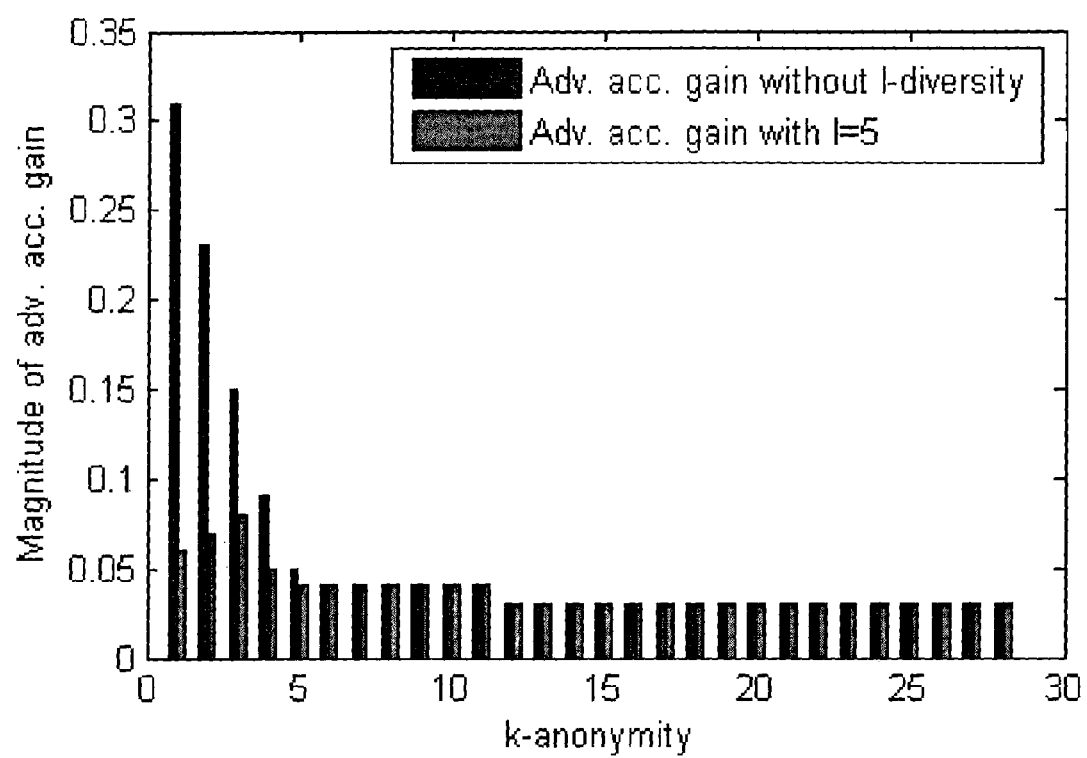
FIG. 5 illustrate exemplary embodiments of the invention.
Figure 6:
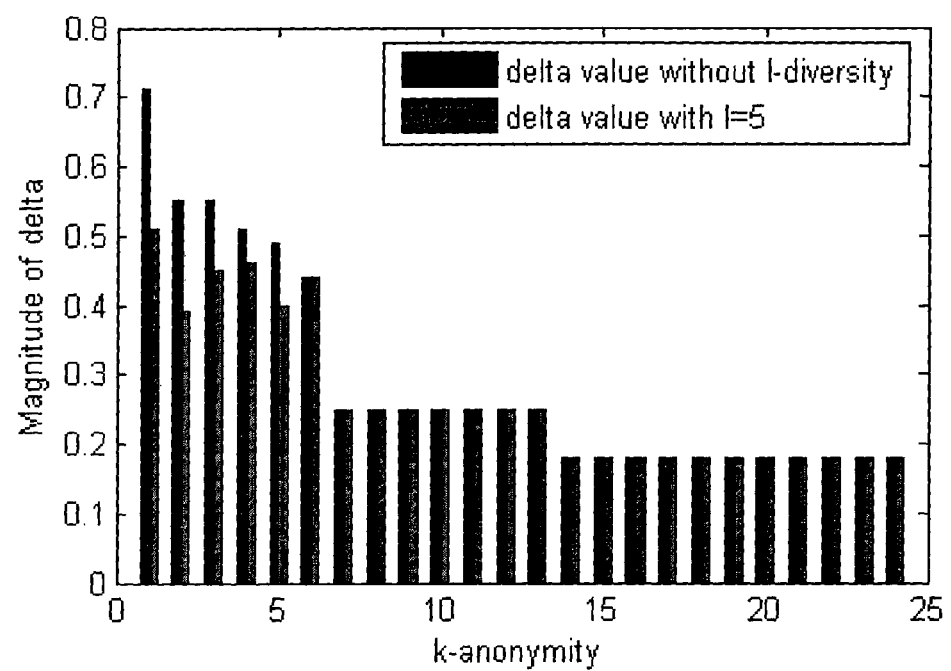
FIG. 6 illustrate exemplary embodiments of the invention.

The first step is to demonstrate the variation of adversary's knowledge gain when k-anonymized l-diverse algorithm is used and when only k-anonymized algorithm used. The used data has leptokurtic distribution of kurtosis κ=7.8 for medical database and κ=5.5 for financial database. Referring to FIG. 4, initially $A_{know}^l \leq A_{know}$ upto k=l, when k=l=5, $A_{know}^l \cong A_{know}$.

Still referring to FIG. 4, as the value of k in k-anonymity increases, the lesser is adversary's accuracy gain ($A_{acc}$). With $A_{acc}$, the attacker/adversary may predict the sensitive attribute value looking at the sanitized database. With increasing value of k, $A_{acc}$ decreases and when l-diversity is included along with k-anonymity in the sanitization method, there is a substantial reduction of the adversarial accuracy gain, that is, $A_{acc}^l \leq A_{acc}$, for k≤l, where $A_{acc}^l$ is the adversarial accuracy gain when the sanitization method includes k-anonymity and l-diversity. However, when k>l, $A_{acc}^l \leq A_{acc}$ (at k=6 onwards). Thus, k-anonymized l-diverse data set becomes independent of l-value, when k>l for leptokurtic distribution in terms of A, and $A_{know}$. As the value of k in k-anonymity increases, there is a greater number of tuples in each equivalence class $c \in E_Q$. So, the probability of sensitive attribute values being present in a single equivalence class increases, thereby decreasing the sensitive attribute disclosure probability. Thus the upper bound of sensitive attribute disclosure δ also decreases. Thus, the adversary's differential entropy (information gain) is bounded by the prescribed threshold, which minimizes the impact of l-diversity on the sensitive attributes.

We claim:

1. A database privacy protection method comprising:
    determining, via one or more processors, a distribution pattern of one or more database attributes by applying Kurtosis measurement of data corresponding to the attributes to ascertain whether the distribution pattern is leptokurtic;
    determining, via the one or more processors, an adversary information gain for a k-anonymity data sanitization model and adversary information gain for a k-anonymity l-diversity data sanitization model, wherein the adversary information gain is the difference between entropy of S and a conditional entropy H(S|Q), and wherein S corresponds to a set of the attributes;
    comparing, via the one or more processors, the adversary information gain of the k-anonymity data sanitization model with the adversary information gain of the k-anonymity l-diversity data sanitization model repeatedly until the adversary information gain of the k-anonymity data sanitization model equals the adversary information gain of the k-anonymity l-diversity data sanitization model;
    determining, via the one or more processors, an optimal value of l for performing l-diversity based data sanitization on database records related to the attributes and an optimal value of k for performing k-anonymity based data sanitization on the attributes; and
    performing, via the one or more processors, privacy preservation of the attributes by only k-anonymity data sanitization model when k is greater than l and the distribution pattern is leptokurtic.

2. The method as claimed in claim 1, wherein the method further comprises the step of determining the optimal value of l for performing l-diversity based data sanitization and k for performing k-anonymity based data sanitization using a Normalized Certainty Penalty.

3. The method as claimed in claim 1, wherein the method further comprises the step of determining a privacy disclosure probability that decreases with increase in value of k/l.

4. The method as claimed in claim 1, wherein the method further comprises the step of evaluating a reduction in complexity for performing data privacy preservation by using the k-anonymity data sanitization model as compared to using the k-anonymity l-diversity data sanitization model.

5. A database privacy protection system comprising:
    one or more hardware processors; and
    one or more memory units storing instructions executable by the one or more hardware processors to perform operations comprising:
        determining a distribution pattern of one or more database attributes by applying Kurtosis measurement of data corresponding to the attributes to ascertain whether the distribution pattern is leptokurtic;
        determining an adversary information gain for a k-anonymity data sanitization model and adversary information gain for a k-anonymity l-diversity data sanitization model, wherein the adversary information gain is the difference between entropy of S and a conditional entropy H(S|Q), and wherein S corresponds to a set of the attributes;
        comparing the adversary information gain of the k-anonymity data sanitization model with the adversary information gain of the k-anonymity l-diversity data sanitization model repeatedly until the adversary information gain of the k-anonymity data sanitization model equals the adversary information gain of the k-anonymity l-diversity data sanitization model;
        determining an optimal value of l for performing l-diversity based data sanitization on database records related to the attributes and an optimal value of k for performing k-anonymity based data sanitization on the attributes; and
        performing privacy preservation of the attributes by only k-anonymity data sanitization model when k is greater than l and the distribution pattern is leptokurtic.

6. The system as claimed in claim 5, the one or more memory units storing instructions executable by the one or more hardware processors to perform operations further comprising:
    calculating a privacy disclosure probability that decreases with increase in value of k/l.

7. The system as claimed in claim 5, wherein the Kurtosis measurement is greater than 3.

8. The system as claimed in claim 5, the one or more memory units storing instructions executable by the one or more hardware processors to perform operations further comprising:
    evaluating a reduction in complexity for performing data privacy preservation by using the k-anonymity data sanitization model as compared to using the k-anonymity l-diversity data sanitization model.

9. A non-transitory computer-readable medium storing database privacy protection instructions executable by one or more hardware processors to perform operations comprising:
    determining a distribution pattern of one or more database attributes by applying Kurtosis measurement of data corresponding to the attributes to ascertain whether the distribution pattern is leptokurtic;
    determining an adversary information gain for a k-anonymity data sanitization model and adversary information gain for a k-anonymity l-diversity data sanitization model, wherein the adversary information gain is the difference between entropy of S and a conditional entropy H(S|Q), and wherein S corresponds to a set of the attributes;
    comparing the adversary information gain of the k-anonymity data sanitization model with the adversary information gain of the k-anonymity l-diversity data sanitization model repeatedly until the adversary information gain of the k-anonymity data sanitization model equals the adversary information gain of the k-anonymity l-diversity data sanitization model;
    determining an optimal value of l for performing l-diversity based data sanitization on database records related to the attributes and an optimal value of k for performing k-anonymity based data sanitization on the attributes; and
    performing privacy preservation of the attributes by only k-anonymity data sanitization model when k is greater than l and the distribution pattern is leptokurtic.

10. The medium as claimed in claim 9, storing instructions executable by one or more hardware processors to perform operations further comprising:

determining the optimal value of l for performing l-diversity based data sanitization and k for performing k-anonymity based data sanitization using a Normalized Certainty Penalty.

11. The medium as claimed in claim 9, storing instructions executable by one or more hardware processors to perform operations further comprising:

determining a privacy disclosure probability that decreases with increase in value of k/l.

12. The medium as claimed in claim 9, storing instructions executable by one or more hardware processors to perform operations further comprising:

evaluating a reduction in complexity for performing data privacy preservation by using the k-anonymity data sanitization model as compared to using the k-anonymity l-diversity data sanitization model.

* * * * *